United States Patent
Tuvell et al.

(10) Patent No.: US 9,069,957 B2
(45) Date of Patent: Jun. 30, 2015

(54) SYSTEM AND METHOD OF REPORTING AND VISUALIZING MALWARE ON MOBILE NETWORKS

(75) Inventors: George Tuvell, Westerville, OH (US); Chunyu Jiang, Columbus, OH (US)

(73) Assignee: Juniper Networks, Inc., Sunnyvale, CA (US)

( * ) Notice: Subject to any disclaimer, the term of this patent is extended or adjusted under 35 U.S.C. 154(b) by 1206 days.

(21) Appl. No.: 11/869,729

(22) Filed: Oct. 9, 2007

(65) Prior Publication Data

US 2008/0086773 A1    Apr. 10, 2008

Related U.S. Application Data

(60) Provisional application No. 60/828,513, filed on Oct. 6, 2006, provisional application No. 60/828,500, filed on Oct. 6, 2006.

(51) Int. Cl.
H04L 29/06 (2006.01)
G06F 21/55 (2013.01)
G06F 21/56 (2013.01)
H04L 29/08 (2006.01)

(52) U.S. Cl.
CPC .............. *G06F 21/552* (2013.01); *G06F 21/55* (2013.01); *G06F 21/56* (2013.01); *H04L 63/145* (2013.01); *H04L 63/1491* (2013.01); *H04L 67/36* (2013.01)

(58) Field of Classification Search
CPC .............................. H04L 63/145; G06F 21/56
USPC ............... 713/193–194, 187–188; 726/22–25
See application file for complete search history.

(56) References Cited

U.S. PATENT DOCUMENTS

| | | | |
|---|---|---|---|
| 6,993,660 B1 * | 1/2006 | Libenzi et al. | 713/188 |
| 7,062,553 B2 * | 6/2006 | Liang | 709/224 |
| 7,287,281 B1 | 10/2007 | Szor | |
| 7,331,061 B1 * | 2/2008 | Ramsey et al. | 726/23 |
| 7,426,383 B2 | 9/2008 | Wang et al. | |
| 7,515,926 B2 | 4/2009 | Bu et al. | |
| 7,702,806 B2 * | 4/2010 | Gil et al. | 709/234 |
| 7,748,038 B2 * | 6/2010 | Olivier et al. | 726/24 |
| 7,778,606 B2 | 8/2010 | Ammon et al. | |
| 2002/0116639 A1 * | 8/2002 | Chefalas et al. | 713/201 |
| 2003/0027551 A1 | 2/2003 | Rockwell | |
| 2003/0084321 A1 | 5/2003 | Tarquini et al. | |
| 2004/0028016 A1 | 2/2004 | Billhartz | |
| 2004/0235455 A1 * | 11/2004 | Jiang | 455/411 |
| 2005/0037733 A1 | 2/2005 | Coleman et al. | |
| 2005/0172337 A1 | 8/2005 | Bodorin et al. | |
| 2006/0128406 A1 | 6/2006 | Macartney | |
| 2006/0150250 A1 | 7/2006 | Lee et al. | |
| 2006/0203736 A1 * | 9/2006 | Molen et al. | 370/245 |
| 2006/0276173 A1 | 12/2006 | Srey et al. | |
| 2007/0089172 A1 * | 4/2007 | Bare et al. | 726/24 |
| 2007/0118759 A1 * | 5/2007 | Sheppard | 713/188 |
| 2007/0217371 A1 | 9/2007 | Sinha | |
| 2007/0240217 A1 | 10/2007 | Tuvell et al. | |
| 2007/0240218 A1 | 10/2007 | Tuvell et al. | |

(Continued)

*Primary Examiner* — Josnel Jeudy
(74) *Attorney, Agent, or Firm* — Shumaker & Sieffert, P.A.

(57) ABSTRACT

A network management system monitors malware within a mobile network. The system comprises a receiver component that obtains data regarding malware in the mobile network. The data is obtained from a first source and a second source, where the first source is of a different type than the second source. The monitoring system also includes an analysis component that generates a malware analysis of the mobile network as a function of the data.

29 Claims, 10 Drawing Sheets

(56) References Cited

U.S. PATENT DOCUMENTS

| | | |
|---|---|---|
| 2007/0240219 A1 | 10/2007 | Tuvell et al. |
| 2007/0240220 A1 | 10/2007 | Tuvell et al. |
| 2007/0240221 A1 | 10/2007 | Tuvell et al. |
| 2007/0291945 A1 | 12/2007 | Chuang et al. |
| 2008/0086776 A1 | 4/2008 | Tuvell et al. |
| 2008/0178294 A1* | 7/2008 | Hu et al. .......... 726/24 |
| 2013/0031599 A1* | 1/2013 | Luna et al. .......... 726/1 |

\* cited by examiner

SYSTEM AND METHOD OF REPORTING AND VISUALIZING MALWARE ON MOBILE NETWORKS

CROSS-REFERENCE TO RELATED APPLICATIONS

This application claims the benefit of U.S. Provisional Application Ser. No. 60/828,513 entitled, "System and Method for Reporting and Visualizing Viruses on Mobile Networks", filed on Oct. 6, 2006; and U.S. Provisional Application Ser. No. 60/828,500 entitled, "Malware Sample Collection on Mobile Networks", filed on Oct. 6, 2006.

TECHNICAL FIELD

The present invention relates generally to systems, devices, and methods for detecting malware in mobile networks and mobile devices.

BACKGROUND OF THE INVENTION

Most malware, whether worm or virus, share a common characteristic: they tend to spread over time from one device to another device if not contained. The ability to get up-to-date and real-time metrics on mobile networks is critical for quickly developing strategies for containing worm and other virus attacks. There is a need to assimilate statistical information about potential malware on the network and present it to network administrators in a meaningful way so they can quickly take appropriate actions to stop worm and other virus attacks before they have had a chance to widely proliferate.

Client anti-virus applications provide a level of security against malware on mobile phones. However, network operators also need to reinforce the security at the network level to ensure that all handsets are uniformly protected regardless of whether or not the client devices install anti-virus software. Malware-detection systems at the mobile network level have to run so that they will not introduce significant delay to the network traffic. This is because mobile networks transmit voice traffic and introducing even a minor network delay would unacceptably degrade voice quality. Placing a detection system so that network traffic passes directly through the detection system, or "in-line" with the network communication, allows the detection system to scan all data blocks passing through the network. This permits infected data blocks to be blocked before they reach another mobile device. However, such an in-line detection system can introduce unacceptable latency and a corresponding decrease in quality of service to the mobile user.

Currently, once malware has been identified and analyzed, it can be detected using signatures extracted from the malware and cleaned according to its specific ways of spreading and infecting. The more difficult problem is in identifying new malware as early as possible to prevent it from proliferating. Although firewalls are used in the mobile network to limit or forbid suspicious behavior, no existing methods provide a comprehensive security solution towards eliminating all new malware. This is at least in part because the forms and functionalities of new malware are unpredictable. Also, malware can propagate through any number of locations making it impossible to capture all new malware samples at a single location. To effectively combat new malware, new malware samples need to be quickly gathered, identified, and analyzed as soon as they appear on the network so that cleaning schemes using signature schemes or other methods can be implemented before the malware has had a chance to widely proliferate. The sooner a sample of new malware is obtained, the sooner the mobile network can be protected against the new malware and the less damage the malware will ultimately cause.

New malware and malware variants are constantly appearing. Once new malware has been identified, service providers need a way to update mobile devices in the network so that they can remove the new malware from the mobile devices or prevent other mobile devices from becoming infecting. With most malware prevention systems, users manually initiate a process to update their malware prevention system with a server. In the interim, however, their systems remain vulnerable to the new malware. With the growing popularity of smart phones and the potential for greater interaction between mobile phones, there is a need to be able to update mobile devices as soon as new malware is identified.

SUMMARY OF THE INVENTION

The following summary is intended to provide a simple overview as well as to provide a basic understanding of the subject matter described herein. It is not intended to describe or limit the scope of the claimed subject matter. Furthermore, this summary is not intended to describe critical or key elements of the claimed subject matter. Additional aspects and embodiments are described below in the detailed description.

CoreStats

The present invention is a system and method for reporting and visualizing worm and other virus attacks on mobile networks. The system and method provides a comprehensive means for collecting, reporting, and providing visual depictions of information regarding the propagation and effect of worms, viruses and other malware on a network. Malware and virus as used hereafter are meant to encompass a broad definition of malicious or harmful software. Carrier and enterprise network operators and managers use real-time statistics to understand the effects malware has on their networks and the mobile devices connected to their networks. Malware protection system updates are performed on mobile devices in the service provider's network as soon as new malware is detected and identified.

Malware Sample Collection

The present invention is a system and method for obtaining new malware samples once they start spreading within a mobile network, and sending those malware samples to an anti-virus or sample collection center for analysis. Collection agents are distributed within a mobile network at various network locations or sites. The collection agents collect executable programs that are being transferred through various protocols, e.g., Bluetooth and WiFi, using both mobile stations and key communication components in the network, e.g., a GGSN in a GSM network and a PDSN in a CDMA network. The system and method works by collecting data from distributed locations, thereby increasing the likelihood that a new malware sample are captured once it starts spreading.

BRIEF DESCRIPTION OF THE DRAWINGS

The claimed subject matter is described with reference to the accompanying drawings. In the drawings, like reference numbers indicate identical or functionally similar elements. Additionally, the left-most digit(s) of a reference number identifies the drawing in which the reference number first appears.

FIG. 8 is an exemplary operator display screen of a user infection report in accordance with an aspect of the subject matter described herein.

FIG. 9 is an exemplary operator display screen of a sample virus producer report in accordance with an aspect of the subject matter described herein.

DETAILED DESCRIPTION

CoreStats

Figure 1:
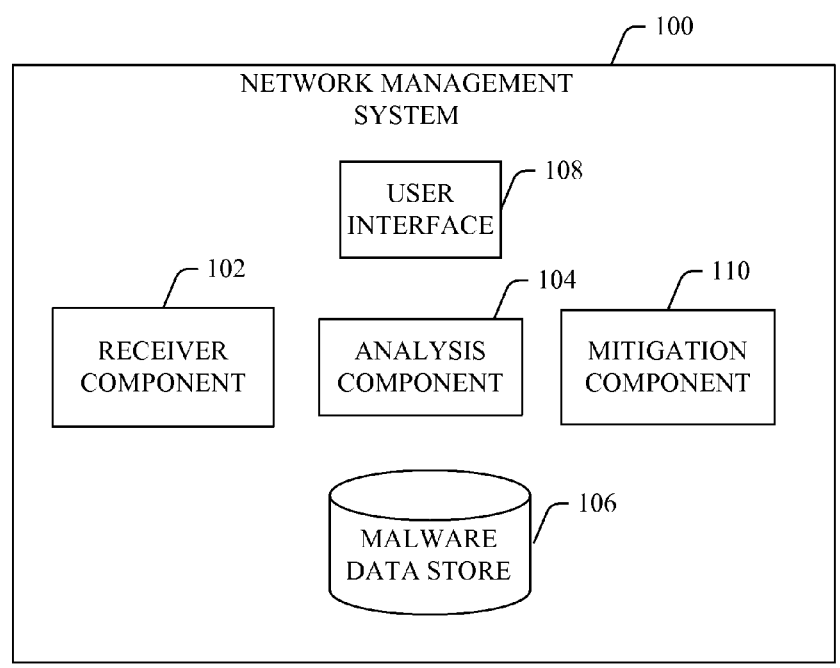
FIG. 1 is an block diagram of an exemplary network management system in accordance with an aspect of the subject matter described herein.

FIG. 1 depicts an exemplary network management system 100, also referred to herein as CoreStats, that provides for reporting and visualizing viruses on mobile networks. As used herein, the term "exemplary" indicates a sample or example. It is not indicative of preference over other aspects or embodiments. The network management system 100 includes a receiver component 102 that obtains or receives malware data for a mobile network (not shown). As used herein, the term "component" refers to hardware, software, firmware or any combination thereof. Malware data includes information related to the presence, spread, or effect of malware on a mobile network. In certain embodiments, the malware data includes a reference to particular devices infected or affected by malware. Such information is advantageous in tracking the spread of malware, as well as, controlling future transmission of malware between client mobile devices (e.g., mobile phones, smart phones, portable digital assistants ("PDAs"), laptops and other mobile electronic devices), also referred to herein as client devices or mobile devices.

In another embodiment, the receiver component 102 obtains malware data from a plurality of sources, such as individual mobile devices, mobile network traffic and/or computer network traffic (e.g., Internet Protocol (IP) packets). Malware data obtained from multiple sources provides a more complete picture of the current state of a mobile network. Consequently, collection or receipt of information from a variety of sources facilitates the detection and analysis of the spread of malware.

An analysis component 104 receives information from the receiver component 102 regarding the presence, effects and types of malware impacting a mobile network. In an embodiment, the analysis component 104 is able to synthesize malware data received from the plurality of sources to better analyze the nature and effect of malware. In another embodiment, the analysis component 104 generates a malware analysis or report that details and describes instances of malware in the mobile network and the particular mobile devices affected by malware.

A malware data store 106 records malware related information including, but not limited to, malware analysis, reports or processed malware data generated by the analysis component 104. In another embodiment, the malware data store 106 stores raw information gathered by the receiver component 102. As used herein, the term "data store" refers to a collection of data (e.g., database, file, cache). In an embodiment, any user specific information is stored in a secure data store to maintain customer privacy.

A user interface 108 utilizes reports and malware analysis generated by the analysis component 104 to provide operators with information regarding malware within the network. In an embodiment, the user interface 108 is implemented as a graphical user interface ("GUI") that renders graphic images that facilitate operator analysis of malware. The user interface 108 can be implemented utilizing a variety of hardware (e.g., a display and input/output devices) and software. In an embodiment, the user interface 108 includes a monitor (e.g., LCD, CRT) that displays malware reports and controllers, such as a keyboard, mouse, trackball, pointer or any other input/output device.

In a further embodiment, CoreStats 100 includes a mitigation component 110 that initiates and takes actions to mitigate or alleviate the impact of malware in a mobile network. The mitigation component 110 gathers information from the receiver component 102 as well as the malware analysis generated by the analysis component 104. In an embodiment, the mitigation component 110 uses this information to dynamically change the parameters of the scanning algorithms utilized to detect the presence of malware either in network traffic or on individual mobile devices and to modify the malware detection algorithms used to identify malware. Some representative malware algorithms include, but are not limited to, malware signature searches; hash signature searches as described in U.S. patent application Ser. No. 11/697,647 "Malware Detection System and Method for Mobile Platforms"; and malware detection in headers and compressed parts of mobile messages as described in U.S. patent application Ser. No. 11/697,658 "Malware Detection System and Method for Compressed Data on Mobile Platforms".

CoreStats 100 assists mobile network administrators and operators in stopping malware from spreading by interacting with other network systems. In particular, once CoreStats 100 determines that a mobile station or mobile device is spreading malware, CoreStats 100 allows network administrators and operators to evaluate a range of options to help prevent the further spread of the malicious application to other mobile stations. One way is to associate CoreStats 100 with the mobile network administrator's firewall so that the administrator can block identified malicious content. Another way is to report alarms upstream to operational support systems or OAM&P (Operations, Administration, Maintenance, and Provisioning) systems used by network service providers to manage mobile networks.

In another embodiment, CoreStats 100 facilitates malware prevention by informing mobile device users and/or taking preventative steps at the mobile device. Once CoreStats 100 identifies an infected user, network administrators or operators send messages to a user to alert them to the problem, force an update of the user's mobile device's anti-virus software and definitions, or even disable the mobile device's data connections altogether.

Figure 2:
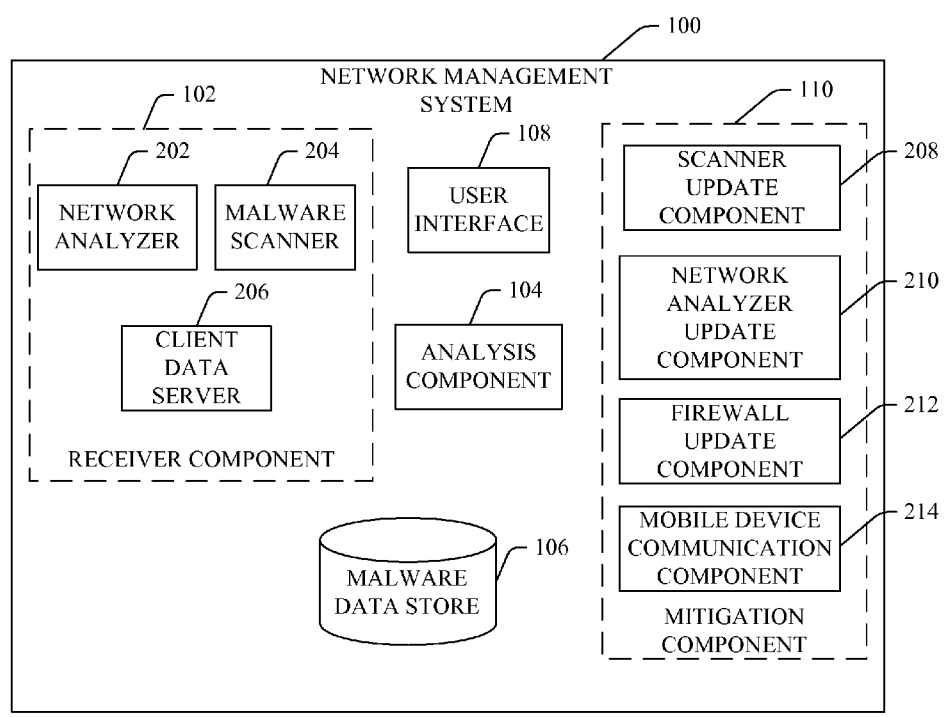
FIG. 2 is an block diagram of another exemplary network management system in accordance with an aspect of the subject matter described herein.

Turning now to FIG. 2, a network management system or CoreStats 100 is illustrated in greater detail. In an embodiment, the receiver component 102 includes a network analyzer 202 or packet sniffer that monitors network traffic. The network analyzer 202 can be implemented as software and/or hardware that intercepts and logs traffic passing over a network or a portion of a network. In an embodiment, the network analyzer 202 intercepts communications between the mobile network and a data network (e.g., the Internet). In an alternate embodiment, the network analyzer 202 intercepts data within the mobile network.

Intercepted or "sniffed" data packets are analyzed by a data stream scanner or malware scanner 204 to identify malware present in the data packets and the addresses of the transmitting and/or receiving mobile device. Data is analyzed in real time packet by packet or stored and analyzed non-linearly. In some instances, the data packets may need to be reassembled in the proper order and the contents extracted before analysis can be done.

In a further embodiment, the receiver component 102 includes a client data server 206 that receives reports of viruses or other malware from one or more client mobile devices. Individual mobile devices utilize scanning software to determine when malware is present and transmit malware or infection reports to the mobile network. Some representative malware scanning algorithms for mobile devices include, but are not limited to, malware signature searches; hash signature searches as described in U.S. patent application Ser. No. 11/697,647 "Malware Detection System and Method for Mobile Platforms"; malware detection in headers and compressed parts of mobile messages as described in U.S. patent application Ser. No. 11/697,658 "Malware Detection System and Method for Compressed Data on Mobile Platforms"; malware modeling as described in U.S. patent application Ser. No. 11/697,642 "Malware Modeling Detection System and Method for Mobile Platforms"; malware modeling for limited access devices as described in U.S. patent application Ser. No. 11/697,664 "Malware Modeling Detection System and Method for Mobile Platforms"; and non-signature detection methods as described in U.S. patent application Ser. No. 11/697,668 "Non-Signature Malware Detection System and Method for Mobile Platforms". The malware reports include malware data, such as information regarding infected files, type, or name of infection. In an embodiment, the malware reports include device specific information such as current device hardware, software and/or an identifier for the infected mobile device (e.g., telephone number).

In certain embodiments, malware data obtained by the network analyzer 202 and client data server 206 includes device-specific information. In particular, reports received by the client data server 206 include data identifying the particular device that detected the malware. The malware data received by the network analyzer 202 is correlated with data from the mobile network to identify the mobile device that transmitted the infected packet or packets. In both cases, the identity of the affected mobile device is determined. Such device specific information is critical in analysis and reaction to the presence of malware within a network.

The analysis component 104 processes or analyzes malware data received via the client data server 206, the malware scanner 204, and/or any other source. Malware may use a variety of techniques to spread and may even be designed to avoid detection. Monitoring a plurality of sources increases the likelihood of early detection of malware, before infection becomes widespread. In addition, use of data from multiple sources, as well as, historical data retrieved from the malware data store 106, increases accuracy of the malware analysis. The resulting malware analysis is stored in a malware data store 106 and/or presented to operators via the user interface 108.

The mitigation component 110 can take a variety of actions to lessen impact of malware present in the mobile network and/or to prevent introduction of additional malware. For example, the mitigation component 110 can include a scanner update component 208 that updates or reconfigures the malware scanner 204 to improve detection of malware. For example, when a new malware variant is discovered, the scanner update component 208 allows the malware scanner 204 to begin scanning for the new malware variant. In an embodiment, the user interface 108 presents operators with update options or suggestions. The operator utilizes the user interface 108 to control update of the malware scanner 204 via the scanner update component 208. In another embodiment, the scanner update component 208 automatically reconfigures the malware scanner 204 based at least in part upon malware analysis by the analysis component 104.

In another embodiment, the mitigation component 110 includes a network analyzer update component 210. The network analyzer update component 210 reconfigures or modifies the network analyzer 202 to control which data packets are intercepted or selected by the network analyzer 202 for further analysis by the malware scanner 204. Due to time and processing power constraints, analysis of all data packets by the network analyzer 202 may not be feasible. Accordingly, the network analyzer 202 selects a subset of the data packets for further analysis. The network analyzer 202 identifies certain packets for further evaluation based upon indicia of malware infection based on the various malware detection algorithms employed. For example, if a pattern of malware infection is identified as occurring in mobile devices after suspect mobile applications are downloaded from a specific internet site, the network analyzer 202 can be set to trigger capture of data from that site for further analysis. Suspect mobile devices thought to be infected with malware are also targeted to not only help stop the further spread of malware, but also provide network administrators additional information about how certain malware variants are spreading, so that the new ways of combating the spread of different malware variants can be developed. The network analyzer 202 also reassembles data packets and/or extracts contents when required. The network analyzer update component 210 updates indicia used to identify data packets for further analysis and increase the likelihood that infected packets are selected. In an embodiment, the user interface 108 presents operators with network analyzer 202 update options or suggestions. An operator directs update of the network analyzer 202 using the user interface 108. Alternatively, the network management system 100 automatically triggers the network analyzer update component 210 based at least in part upon analysis of received malware data.

In still another embodiment, the mitigation component 110 includes a firewall update component 212 capable of updating or reconfiguring one or more firewalls (not shown) to prevent the spread of malware. As discussed in greater detail below, mobile networks frequently exchange data packets with data networks such as the Internet. Typically, a firewall is installed between the mobile network and the data network to prevent spread of malware between the networks. As malware infected identified sites or malware infected mobile devices are identified, the firewall is updated to prevent transmission of infected data packets between the networks. In the case of major worldwide virus or malware outbreaks, a firewall can quickly disrupt the flow of data between the mobile network and the Internet except for those sites specifically enabled or used by network administrators. In an embodiment, the user interface 108 presents operators with firewall update options or suggestions. An operator directs update of the firewall using the user interface 108. In another embodiment, the firewall update component 212 automatically updates the firewall, based at least in part upon analysis of malware data.

In a further embodiment, the mitigation component 110 includes a mobile device communication component 214 that directs updates of malware scanners maintained on individual mobile devices. As described in further detail below, mobile devices include client malware scanners that detect malware or infection of the mobile device. These individual mobile device malware scanners can be updated to enhance detection of malware. In an embodiment, the mobile device communication component 214 identifies or prioritizes particular mobile devices for update. The mobile device communication component 214 transmits the updated malware scanner directions to the mobile network or particular mobile devices for installation. The update are based at least in part upon the analysis of malware within the mobile network, and are targeted to those mobile devices most susceptible to attack, for instance, heavy Internet data users. In another embodiment, an operator directs update of mobile devices through a user interface 108.

In still a further embodiment, the mobile device communication component 214 helps stop the spread of malware using a Hybrid Intrusion Prevention System (HIPS). In HIPS, the client device has software installed which controls the access of downloaded applications. Whenever CoreStats 100 detects possible malicious activity, the mobile device communication component 214 sends a message to the client device, which in turn issues a warning to the user before executing the downloaded application or asks the user permission to delete the downloaded application. HIPS allows the network analyzer 202 and malware scanner 204 and analysis component 104 additional time to thoroughly scan a downloaded application while not becoming unnecessarily intrusive to the user or delaying the download of the application.

Figure 3:
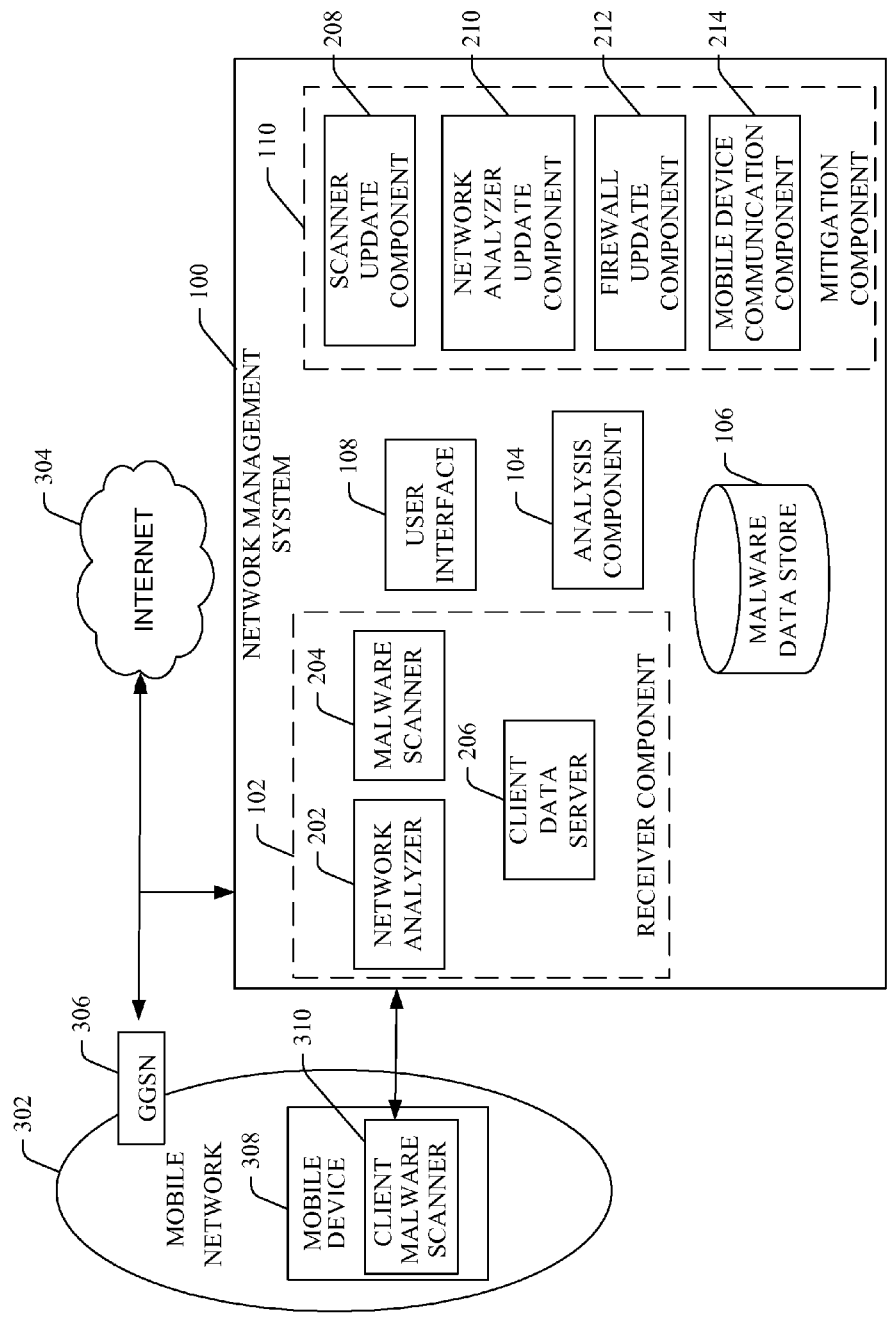
FIG. 3 is a block diagram of an exemplary deployment of a network management system.

Referring now to FIG. 3, an exemplary deployment of a sample CoreStats system 100 in a network environment is depicted. FIG. 3 illustrates a deployment of CoreStats 100 between the edge of a mobile network 302 and the Internet 304, although it can also be deployed effectively at various other points in the mobile network 302 depending upon the network topology and desired coverage. The network analyzer 202 monitors and evaluates all traffic going from the mobile network 302 to the public data networks (e.g., the Internet 304) and vice-versa. The network analyzer 202 can intercept packets on either side of a firewall (not shown).

In an embodiment, CoreStats 100 monitors a mobile network (or operator's network) 302 by monitoring or packet sniffing IP packets passing from the Gateway General Packet Radio Service ("GPRS") Support Node or Gateway GPRS Support Node ("GGSN") 306 and the Internet 304. In an embodiment, CoreStats 100 is deployed between the edge of the mobile network 302 and the Internet 304. The GGSN 306 links the access dependent Radio Access Network (RAN), shown on the figure as the mobile network 302, to the access independent Internet 304. RAN comprises the entire radio/wireless network with a variety of protocols for data transfer (e.g., CDMA, GPRS, 802.11). The GGSN 306 acts as a gateway between the mobile network 302 and the Internet 304, converting access-specific packet data to IP packets and vice-versa. As discussed above, the intercepted packets are processed by the malware scanner 204 and the resulting malware data is provided to the analysis component 104.

In another embodiment, CoreStats 100 receives communications from mobile client devices (also referred to as mobile devices or client devices) 308. In certain embodiments, mobile client devices 308 include a client malware scanner 310 capable of detecting malware on mobile client devices 308. Once malware is detected, the client malware scanner 310 generates an infection report 404 that provides malware data to the receiver component 102 of the CoreStats system 100. The malware data can be used to reconfigure the malware detection algorithms for malware in the network malware scanner 204 and client malware scanners 310.

Figure 4:
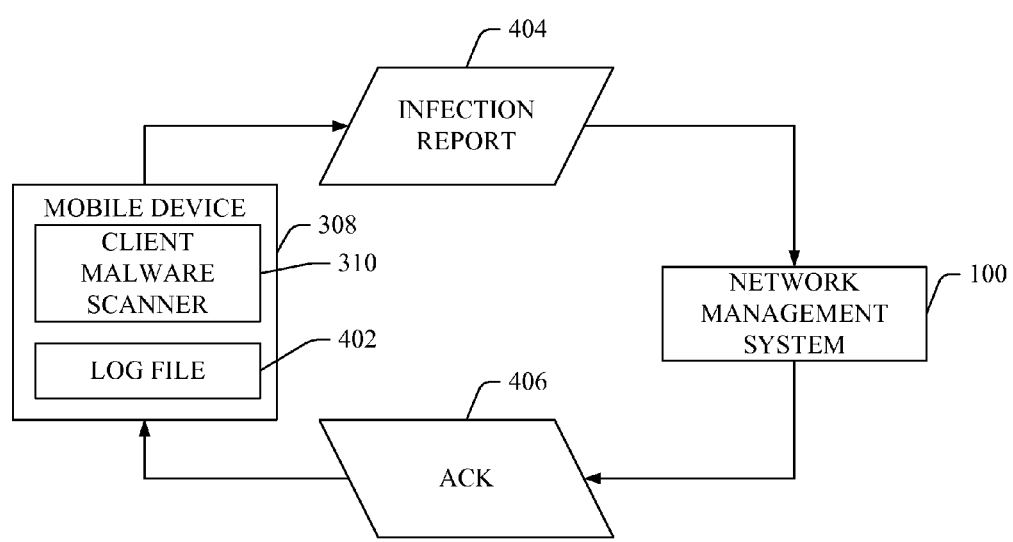
FIG. 4 is a block diagram depicting exemplary the communications between a client mobile device and a network management system in accordance with an aspect of the subject matter described herein.

Turning now to FIG. 4, a block diagram depicting communication between CoreStats 100 and a mobile device 308 is illustrated. In one embodiment, upon detecting malware, a mobile device 308 generates or updates an internal log file (or log file) 402, recording malware information. The internal log file 402 can be plain text containing the name of the infected file and the name of the malware that infected the file as a semi-colon delimited text file. An exemplary entry in the log file is recorded as follows:

"C:\CinBell_Viruses.zip-Cabir.D(sis);
C:\CinBell_Viruses\3d_oidi500.sis-Cabir.D(sis);
C:\CinBell_Viruses\autoexecdaemon.SIS-Cabir.gen(app);".

In a further embodiment, the client malware scanner 310 generates an infection report 404 that contains information about the detected malware and transmits the infection report 404 to the client data server 206 of CoreStats 100. Report generation transmission is automatically triggered (pushed) upon detection of malware or based upon a periodic fixed time interval. Alternatively, infection reports 404 are maintained in the client device internal log file 402 until queried (pulled) by CoreStats 100. In yet another embodiment, infection reports 404 are delivered to CoreStats 100 using some combination of pulling and pushing. Infection reports 404 are transmitted, for example, using hypertext transfer protocol (http), file transfer protocol (ftp), or any packet data transmission method as would be generally known in the art.

Infection reports 404 typically comprise information such as, but not limited to, detailed virus/threat vector information and mobile device related information, including type of mobile device 308, operating system, software and versions, and user information and mobile device 308 identifier. In an exemplary embodiment, the infection report 404 contains product identification that identifies the client malware scanner 310 software. For example, product identification includes, but is not limited to, a product identifier, major version identifier, minor version identifier and also a patch version as follows: "productid+majorversion+minorversion+patchversion." The infection report 404 can also include the infected filename and a unique identifier for the infected application, the name of the malware infection and the date and time of the infection. In addition, the infection report 404 can include mobile device 308 information, such as the identification of the mobile phone (e.g., phone number), firmware of the particular mobile device 308 (e.g., operating system information) and the software version of the mobile device 308.

Referring once again to FIG. 4, in certain embodiments, transmission of an infection report 404 sent from the mobile device 308 to CoreStats 100 triggers transmission of an acknowledgement 406 from CoreStats 100 to the mobile device 308. Receipt of the acknowledgement 406 triggers the mobile device 308 to delete the existing infection report 404 maintained in the internal log file 402. When the mobile device 308 next detects a virus, the mobile device 308 creates a new infection report 404. In an embodiment, the mobile device 308 continues to send the infection report 404 until an acknowledgement 406 is received from CoreStats 100, ensuring that the infection report 404 is received. This embodiment provides a primitive datagram delivery acknowledgement mechanism for simple protocols such as User Datagram Protocol (UDP). Deleting the infection report 404 after receipt of an acknowledgement 406 is advantageous in that CoreStats 100 is less likely to receive duplicated information about old virus infections from mobile devices 308. Infection reports from CoreStats 404 are transmitted only for current infections. In addition, mobile devices 308 are less burdened memory-wise since they need to retain infection reports 404 locally for a relatively small duration of time. This is particularly advantageous since many mobile devices 308 have limited memory resources. Similarly, simple protocols stacks such as UDP are relatively easy to implement and require small internal state machines, further simplifying the design of malware scanning applications for mobile devices 308.

Turning once again to FIG. 3, one function of the CoreStats system 100 is information gathering. CoreStats obtains information regarding malware form a plurality of sources, including individual mobile device, network traffic analysis and data traffic analysis. In certain embodiments, CoreStats 100 includes a malware data store 106 to store the information gathered by CoreStats 100. In an embodiment, user specific information is stored in a secure data store to maintain customer privacy.

In an exemplary embodiment, the malware data store 106 maintains information obtained based upon network traffic analysis, including, but not limited to, Internet protocol (IP) address of the network level packet analyzer and the time at which the packet was detected. The malware data store 106 maintains records regarding the infected data, such as virus name, infected file name, infected file size, infected packet size and infected packet number. The malware data store 106 also maintains packet source related information, such as the source IP, source port and even source identifier (e.g., phone number). Moreover, destination information such as destination IP address, destination port and destination phone number can be recorded for analysis and reporting. The malware data store 106 can also maintain a record of the particular protocol name used for transmission of the packet.

In another embodiment, the malware data store 106 maintains malware analyses, such as reports generated by the analysis component 104. The reports or malware analyses generated by the analysis component 104 is maintained for use in further analysis, presentation to an operator via a user interface 108 or use in mitigation of malware effects on a mobile network 302. The malware data store 106 is maintained locally within CoreStats or may be remotely located.

In certain embodiments, the analysis component 104 analyzes and correlates malware data obtained by the receiver component 102 and/or maintained by the malware data store 106. In particular, the analysis component 104 correlates data obtained from a variety of sources (e.g., network traffic, data network traffic and individual mobile devices 308). One function of CoreStats 100 is to assist mobile network administrators and operators to monitor threats to the mobile network 302 thereby identifying the mobile network's 302 vulnerability to malware. Early detection of the vulnerability helps them take better preventative measures. CoreStats 100 reports the spreading pattern of malware using collected information from individual mobile devices 308 as well as the network traffic. On the mobile network 302, malware can spread over using short range transmission protocols (e.g., Bluetooth, Infrared), long range or standard network protocols (e.g., TCP/IP, Messaging) or a combination of short and long range protocols. Hence, in order to facilitate reports of infections and spreading patterns of malware across the mobile network 302, CoreStats 100 uses information regarding the infections found in mobile devices 308 as well as those malware found in the network traffic by the network analyzer 202 and malware scanner 204. In particular, CoreStats 100 can generate spreading statistics of long range malware, such as malware that spreads using the mobile network 302 via TCP/IP, Messaging, and/or other protocols. Furthermore, CoreStats 100 can generate spreading statistics of short range malware, such as malware that spreads over Bluetooth, memory cards, or other means without being transported across the mobile network 302.

One feature of CoreStats 100 is the ability to present data to operators showing correlation between infections found in the mobile device 308 and those found in the network traffic. Operators can draw useful conclusions based on this and other correlations. For example, if a larger number of infections are found on mobile devices 308 compared to the number of infections found on the mobile network traffic, it is likely that short range protocols are more prominent than long range protocols in spreading a particular kind of malware through the mobile network 302. Accordingly, efforts to prevent further spread of the malware may be focused on short range protocols.

In certain embodiments, the CoreStats system 100 is able to provide operators with detailed information regarding malware activities in a mobile network 302. In an embodiment, the CoreStats system 100 provides information relating to the density, distribution, geography, type, etc. of infected mobile devices 308 in the mobile network 302. In another embodiment, CoreStats 100 provides information relating to the infected network traffic itself, such as malware identification, traffic patterns and topologies, and the like. In yet another embodiment, CoreStats 100 computes vulnerability of particular mobile devices 308 based on acquired heuristic data about infected mobile devices 308, protocols used, type of malware and the like. In still another embodiment, CoreStats 100 determines vulnerability of a mobile network 302 to certain kinds of malware.

Figure 5:
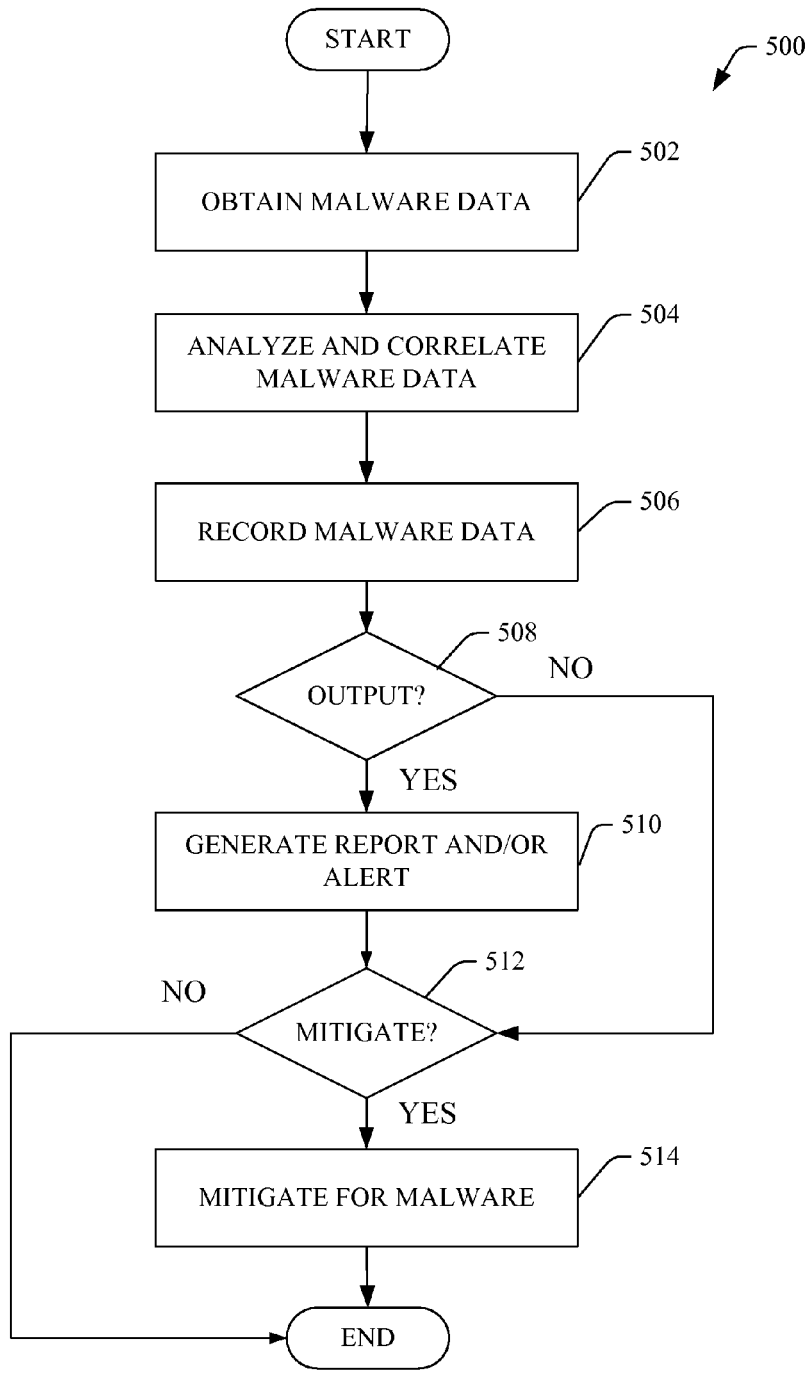
FIG. 5 is a flowchart illustrating an exemplary method for monitoring and mitigating malware in a mobile network in accordance with an aspect of the subject matter described herein.

With reference to FIG. 5, a flowchart depicting a methodology 500 associated with malware monitoring, detection and mitigation is illustrated. For simplicity, the flowchart is depicted as a series of steps or acts. However, the methodology 500 is not limited by the number or order of steps depicted in the flowchart and described herein. For example, not all steps may be necessary; the steps may be reordered, or performed concurrently.

Turning now to FIG. 5, a flowchart depicting an exemplary methodology 500 for mobile network management is illustrated. At reference number 502 malware data is obtained. In an embodiment, malware data is obtained from a plurality of sources, such as individual mobile devices 308, mobile network traffic and a computer network. In another embodiment, malware data includes information that specifies a particular mobile device or devices 308 affected by malware. For example, the malware data can include an identifier for the mobile device 308 reporting the malware or an identifier for the mobile device 308 sending and/or receiving a data packet containing malware.

At reference number 504, the malware data is analyzed and/or correlated. An analysis component 104 generates a malware analysis and/or statistics describing malware activity as well as other pertinent network statistics useful in quantifying relative levels of malware activity. In an embodiment, historical malware data is retrieved from a malware data store 106 utilized in the analysis. In particular, changes in malware activity levels or types and spread of malware over time is examined. In another embodiment, analysis also includes examination of spreading patterns and possible prediction of future spreading of malware. The obtained malware data as well as malware analyses (e.g., statistical information and predictions) are recorded in a malware data store 106 at reference number 506.

At reference number 508 a determination is made as to whether to generate output, such as a report or alert. The determination can be based in whole or in part upon the malware data obtained from various sources. For example, if analysis indicates high levels of malware activity or significant impact on mobile network 302 performance, the determination is made to generate a report and alert or notify network administrators. Alternatively, reports are triggered periodically or upon operator request. In particular, operators can request particular reports via a user interface 108.

If the determination is made to generate output, one or more reports or alerts are generated at reference number 510. Such reports can include information for presentation for an operator, stored for later use, or used in determining appropriate mitigation. If no reports are to be generated, or after generation is complete, the process continues at reference number 512, where a determination is made as to whether to take action to mitigate the effects of malware on the mobile network. If no action is to be taken, the process terminates. If mitigating actions are to be taken, the process continues at reference number 514.

Mitigating actions include preventative steps to avoid or inhibit spreading and/or effects of malware in the mobile network 302. In an embodiment, mitigating actions include update of a network analyzer and/or malware scanner to capture and identify additional types of malware. In still other embodiments, a mitigation component 110 notifies a mobile device 308 user, force an update of mobile device 308 software, or even disable the mobile device's 308 data connections.

Referring now to FIGS. 6-10, exemplary user interface displays are illustrated. As discussed above, CoreStats 100 also performs report generating functions. The analysis component 104 uses both stored and real-time information, including network traffic and individual user information, to generate statistics and dynamic graphs depicting malware activity and network statistics necessary to quantify relative levels of malware activity. For example, the analysis component 104 generates malware analyses, which can be presented by a user interface 108 as straightforward visual reports to alert managers and operators as to which platforms are infected with the most viruses, which viruses are spreading the fastest, the most recently infected mobile devices 308, and which infected mobile devices 308 are spreading the most viruses.

Figure 6:
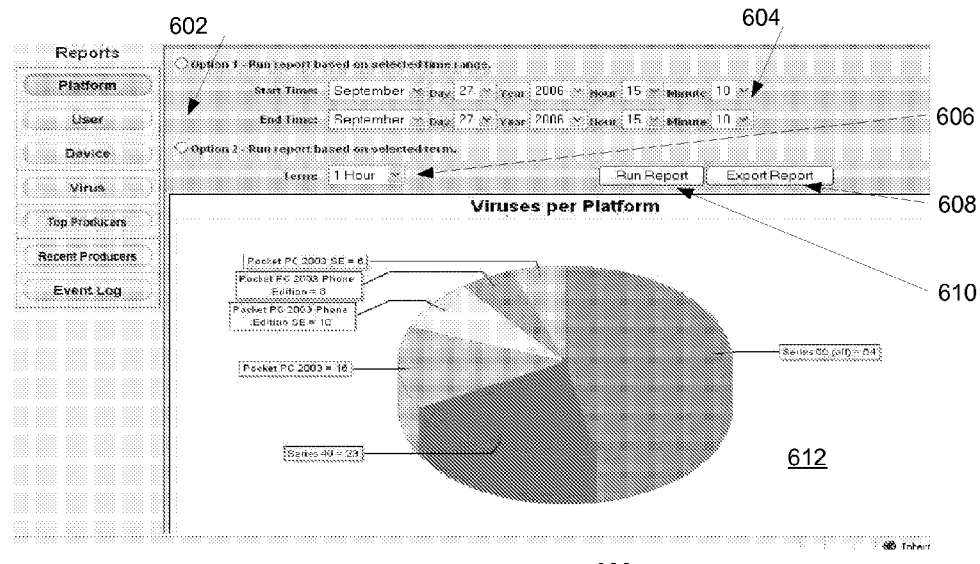
FIG. 6 is an exemplary operator display screen of a malware per platform report in accordance with an aspect of the subject matter described herein.

Referring to now to FIG. 6, a sample malware per platform report 600 is illustrated. The malware per platform report 600 illustrates which platforms are infected with the most malware. The sample malware per platform report 600 comprises option selections 602 for generating a report regarding a selectable interval of time in the past 604 or the most current period of time 606. The report 600 is presented on a display screen 610, as shown. Alternatively, reports 600 are exported 608 to a data structure. For example, reports 600 are output to semi-colon delimited text files. When presented on a display screen 610, the data is presented any number of ways including, for example, a graphical representation 612 of the number of viruses per platform.

Figure 7:
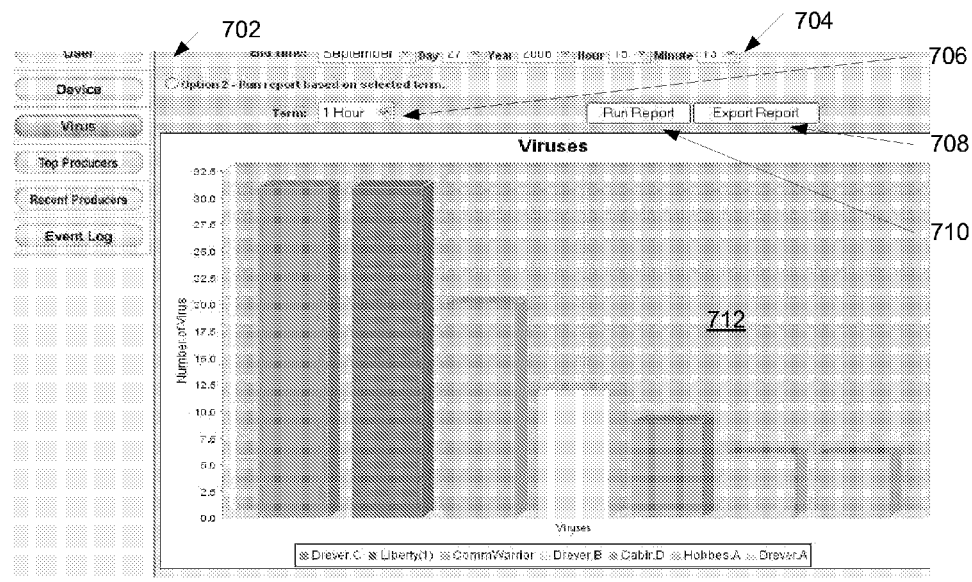
FIG. 7 is an exemplary operator display screen of a malware spreading report in accordance with an aspect of the subject matter described herein.

FIG. 7 illustrates a sample malware spreading report 700. The sample malware spreading report 700 indicates which malware are spreading the fastest throughout the mobile network 302. The sample malware spreading report 700 comprises option selections 702 for generating a report regarding a selectable interval of time in the past 704 or the most current period of time 706. The report 700 is presented on a screen 710 or exported 708 to a data structure. For example, the report 700 is output to a semi-colon delimited text file. When presented on a display screen 710, the data is presented any number of ways including, for example, a graphical representation 712 of the number of instances of each virus detected in the mobile network 302.

Figures 8, 9:
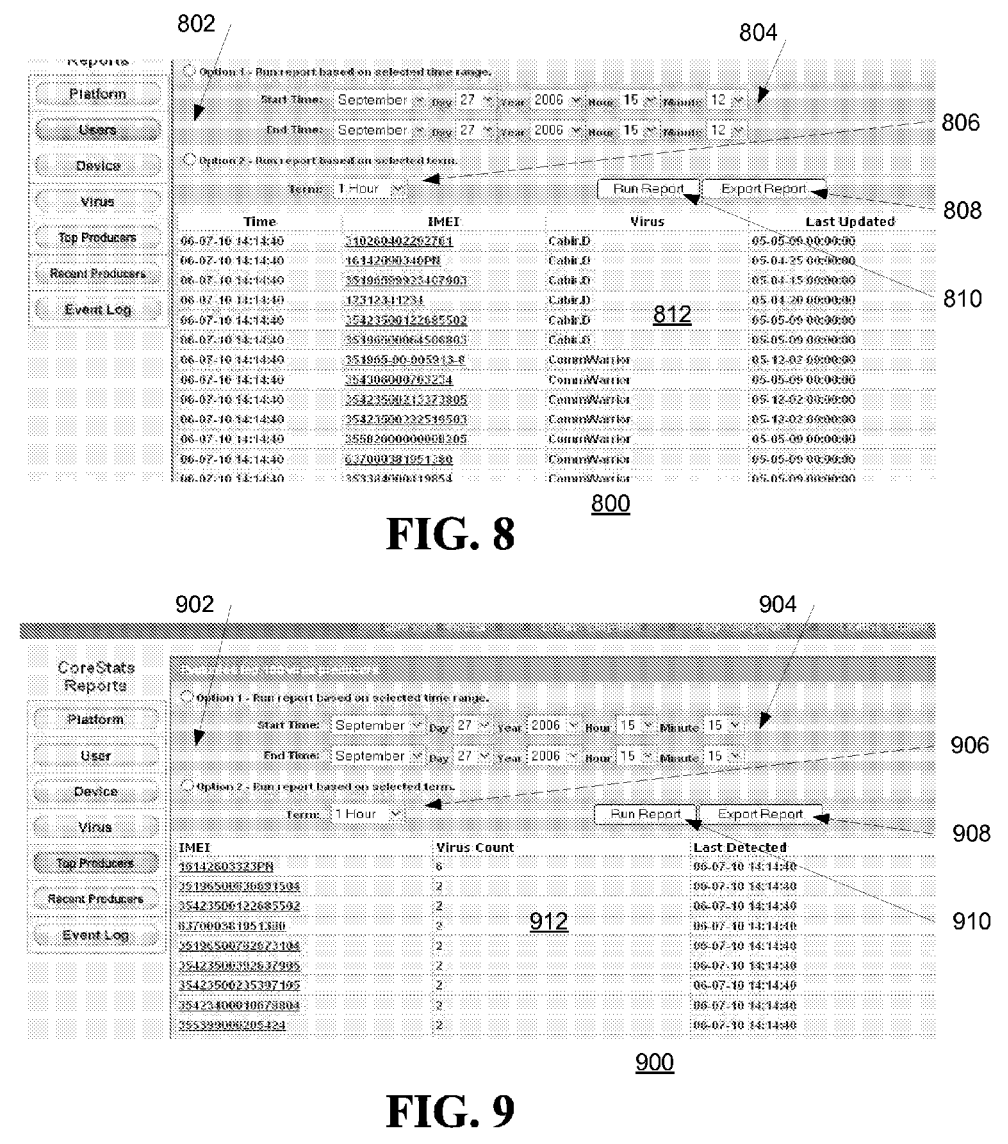

Referring now to FIG. 8, a sample user infection report 800 is illustrated. The sample user infection report 800 shows recently infected users. In an embodiment, the sample user infection report 800 comprises option selections 802 for generating a report 800 regarding a selectable interval of time in the past 804 or the most current period of time 806. The report 800 is presented on a display screen 810 or is exported 808 to a data structure. For example, the report 800 is exported to a semi-colon delimited text file. When presented on a display screen 810, the data is presented any number of ways including, for example, a text list 812 of which platforms are infected by which viruses.

FIG. 9 depicts a sample virus producer report 900. The virus producer report 900 shows which users are responsible for spreading the most malware. The virus producer report 900 comprises option selections 902 for generating a report regarding a selectable interval of time in the past 904 or the most current period of time 906. The report 900 is presented on a display screen 910 or exported 908 to a data structure. For example, the report 900 is exported to a semi-colon delimited text file. When presented on a display screen 910, the data is presented any number of ways including, for example, a text list 912 of which platforms are infected by, and therefore likely to be, spreading the most viruses.

Figure 10:
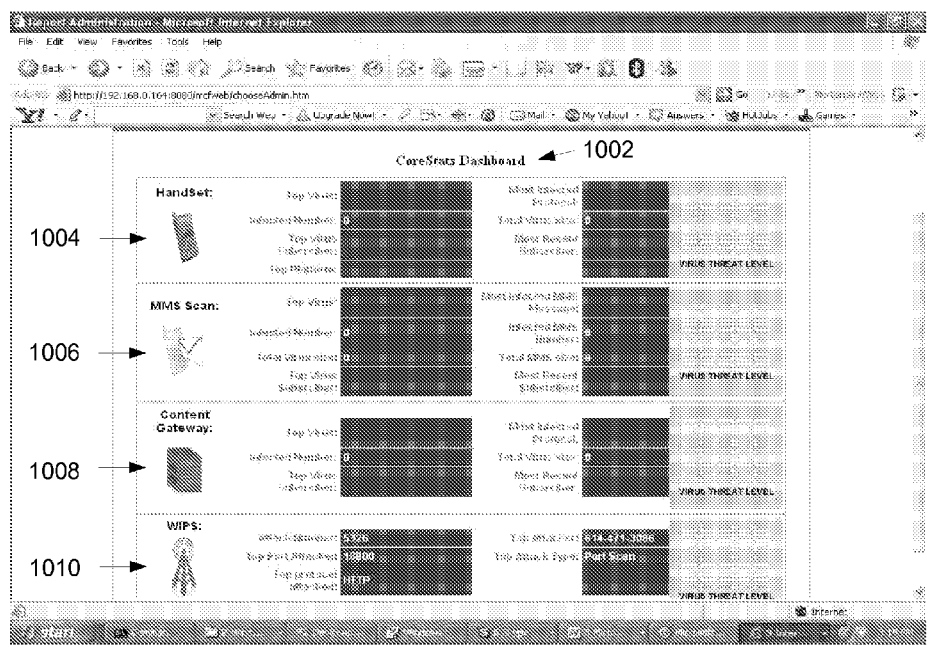
FIG. 10 is an exemplary operator display screen of a real time statistics report in accordance with an aspect of the subject matter described herein.

Referring now to FIG. 10, an exemplary real time statistics report 1000 is illustrated. The real time statistics report 1000 indicates which components of a mobile network 302 are indicating the presence of malware. In an embodiment, a display of the real time statistics reports 1000 has a configurable dashboard 1002. In another embodiment, the dashboard provides metrics on mobile device malware 1004, malware detected during scanning of MMS messages 1006, malware detected as traffic arriving from the Internet through a gateway 1008, or malware detected in the wireless network 1010.

In other embodiments, the analysis component 104 generates additional reports, including the growth of individual viruses over time, infected subscriber information, dynamic virus threat level assessment and loss of operator revenue due to malware traffic. A simple calculation of the loss of operator revenue is based on the following function: Revenue Lost=(Amount of virus traffic)*(Revenue per Byte of data transfer). Other functions and metrics for loss of system performance, bandwidth utilization, capacity degradation, and other metrics can be formed by one of ordinary skill in the art.

CoreStats 100 typically operates as a stand-alone system with some associated virus scanning modules running independently in user mobile devices 308 to aid in reporting and visualizing viruses on mobile networks 302, monitoring the current status of virus infections on a mobile network 302, evaluating the potential threat posed by a new or spreading virus, and providing the tools necessary to evaluate the challenge and initiate corrective actions. CoreStats 100 also integrates with other operational support systems, reporting alarms upstream to typical OAM&P (Operations, Administration, Maintenance, and Provisioning) systems used by network service providers to manage their mobile networks 302. In other embodiments, CoreStats 100 is an application that operates inside the mobile network 302, at the edge of the mobile network 302, inside a GGSN 306, or in a combination of locations. As one familiar in the art would appreciate, these are merely exemplary embodiments of the invention for illustration purposes only, and are not intended to limit the invention to any particular configuration or topology.

CoreStats 100 can be implemented using a general purpose computer. More particularly, a general purpose computer including a processor, memory and a system bus that couples the processor and memory can be used to implement CoreStats 100. The processor can be a microprocessor, microcontroller, or central processor unit (CPU) chip and printed circuit board (PCB). Any suitable bus architecture can be utilized to connect the processor and memory. System memory can include static memory such as erasable programmable read only memory (EPROM), electronically erasable programmable read only memory (EEPROM), flash or bubble memory, as well as volatile memory, such as random access memory (RAM). In addition, the system can include storage media, such as hard disk drive, tape drive, optical disk drive or any other suitable media.

The system can also include various input devices, including a keyboard, mouse stylus, and the like, connected to the processor through the system bus. In addition, the system can include output devices, such as monitors, on which the operators can view the generated reports. Additionally, the system can be connected via a network interface to various communications networks (e.g., local area network (LAN) or wide area network (WAN)).

Malware Sample Collection System

Figure 11:
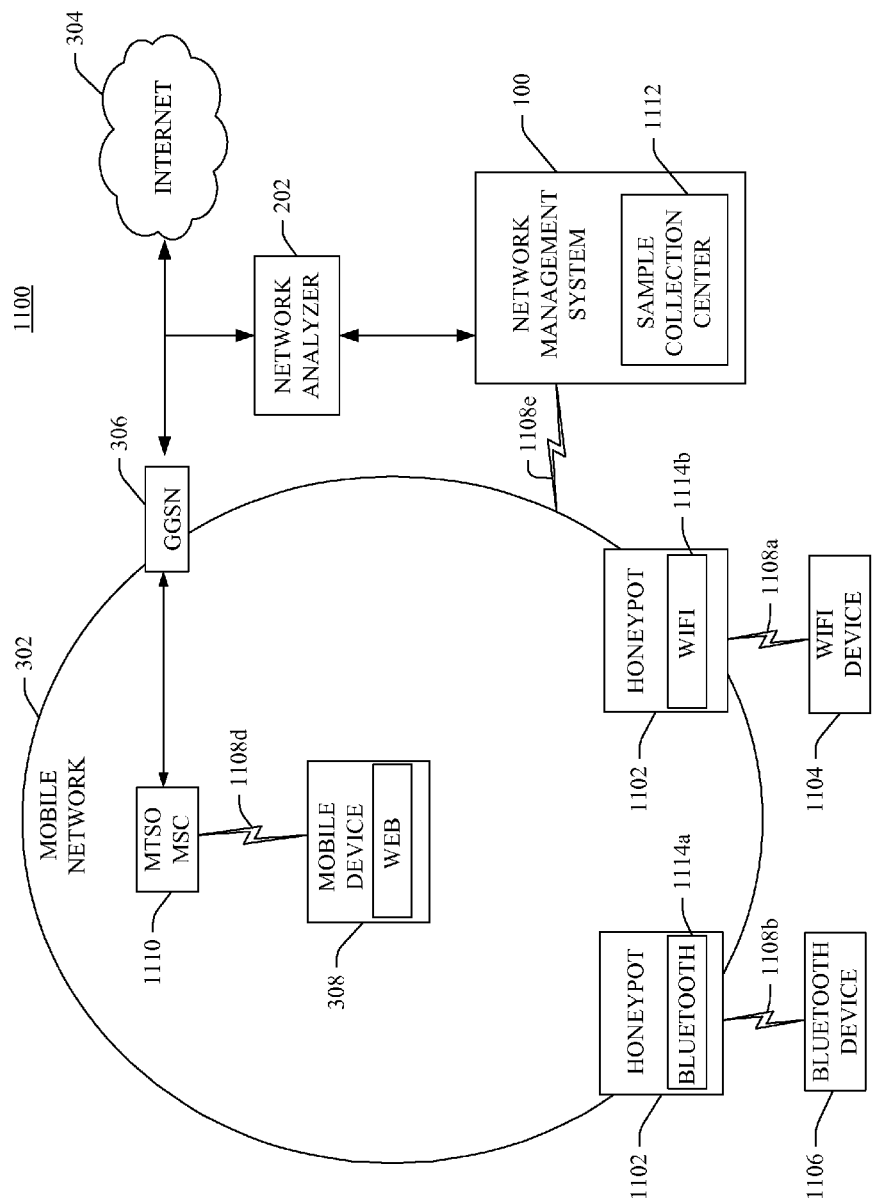
FIG. 11 is an exemplary network diagram illustrating various embodiments of collection agents in a mobile provider's network for collecting suspect data for analysis by the CoreStats Network Management System.

Referring now to the network diagram depicted in FIG. 11, a malware sample collection system 1100 is shown for obtaining samples of executable code that are spreading within a mobile network 302 and sending those samples to a sample collection center 1112 for analysis. In particular, collection agents, or Honeypots, 1102 are distributed within a mobile network 302 at various network locations or sites to collect executable programs being monitored by a protocol handler, e.g., Bluetooth 1114a and WiFi 1114b, (each being a type of protocol handler 1114), using both mobile stations and key communication components in the network, e.g., a GGSN in a GSM network and a PDSN in a CDMA network. The system 1100 collects the samples containing executable code from distributed locations, thereby increasing the likelihood that a new malware sample is captured once it starts spreading.

In operation, malware infected devices, such as Bluetooth devices 1106 and WiFi devices 1104 send connection attempts via a Bluetooth protocolo handler 1114a or a Wi-Fi protocol handler 1114b respectively. A collection agent 1102 accepts the incoming call attempts from the malware infected devices 1104, 1106 and forwards any transferred executables to a sample collection center 1112 of a network management system 100, such as CoreStats 100, using the provider's mobile network 302. Calls from the collection agent 1102 may be switched through the provider's mobile network 302 using a wireless data connection 1108e. Alternatively, the a collection agent 1102 may send information to the sample collection center 1112 across a Public Switched Telephone Network, or PSTN (not shown).

In another embodiment, an Internet enabled mobile device 308 attempting to download an executable from a remote server typically uses TCP/IP and the Web to facilitate the download. The IP packets 1108d from the Internet enabled mobile device 308 are switched at a switching center 1110, typically an MSC or MTSO, to a Gateway 306, which is typically a GGSN (Gateway GPRS Support Node) or PDSN (Packet Data Serving Node), that routes the IP packets 1108d to the Internet 304. In this embodiment, the IP sniffer, or network analyser 202, functions as a collection agent 1102 of the present invention and monitors the connection between the Internet 304 and the Gateway 306, forwarding all sampled executables to the sample collection center 1112.

Collection Agents

A collection agent 1102, 202 is a device which is placed at various points in the mobile network 302 in order to collect samples being transmitted over the network executables, wherein a sample is transmitted data containing executable code. The type of collection agent 1102, 202 and the protocols monitored by the protocol handlers 1114a, 1114b are dependent not only upon the anticipated data loads and protocols being transmitted, but also on the mechanism used by the malware to accomplish its tasks, if known. The use of two types of collection agents, e.g., honeypots 1102 and network sniffers or analyzers 202, provides a network service provider the best opportunity for early detection of malicious applications before they have had a chance to proliferate widely across a service provider's mobile network 302.

Honeypots: Honeypots, collection agent 1102, are typically stand-alone devices that have open network ports for unobtrusively accepting messages that are broadcast or specifically sent to them from malware infected mobile devices 1104, 1106. A typical feature of many malicious applications is that they attempt to forward copies of themselves automatically to other networked devices 308, thereby allowing themselves to spread through the mobile network 302 like a virus. It is possible for malicious applications to copy themselves to nearby mobile devices 308 using ad hoc or similar point-to-point type networks, instead of across the much larger service provider's mobile network 302. This makes it difficult, if not impossible, for the service provider to detect malware because the malware may not be transmitting across the service provider's mobile network 302. A person with a malware infected mobile device 1104, 1106 may during the course of single day come into range of tens, if not hundreds, of other mobile devices 308, possibly infecting many of them. In such cases, the malware may be discovered only at a later date when much of the damage has already been done. Therefore, honeypots 1102 allow earlier detection of malicious applications by virtue of the fact that they are not in the core of the service provider's mobile network 302, as a network analyzer 202 collection agent would be, but rather are spread strategically in the periphery.

Honeypots 1102 can be configured with a Bluetooth protocol handler 1114a and a Wi-Fi protocol handler 1114b. Bluetooth enabled honeypots 1102 are mobile devices 308 or laptops that are placed in areas where there is typically a lot of wireless communication. The aim is to capture Bluetooth broadcast messages 1108b containing malicious executables sent from other nearby Bluetooth enabled, malware infected mobile devices 308. Target areas include airports, restaurants, downtown areas, and public parks. Wi-Fi enabled honeypots 1102 are mobile devices 308 or laptops that are placed in areas where there is a possibility of hacking and illegal access taking place. The aim is to allow illegal access of the honeypot collection agent 1102 in order to capture the malicious executable files sent using the Wi-Fi protocol 1108a from malware infected mobile devices 1104. Target areas include banks and stock exchanges.

Because such honeypot collection agents 1102 can be installed in locations outside of the provider's mobile network 302, calls from such collection agents 1102 may be switched across the Public Switched Telephone Network, or PSTN (not shown). Preferably such collection agents 1102 are switched through the provider's mobile network 302, when possible, as shown by wireless data connection 1108e, to reduce potential calling costs with other service providers.

In different embodiments, honeypot collection agents 1102 use a number of communication interfaces to connect to a sample collection center 1112 of a network management system 100. For example, such communication interfaces may include placing calls over telephony interfaces such as POTS lines or Plain Old telephone Service, ISDN, or other bearer channel technologies, or using data communication networks such as legacy serial or packet-based networks, TCP/IP, xDSL, and fiber-based technologies. Additionally, such collection agents 1102 use wireless interfaces including, but not limited to, WiFi, IEEE 802.11 or more generically 802.x wireless interfaces.

Network Sniffers: Network analyzer 202 collection agents that monitor the service provider's mobile network 302 for transmission of malware applications are strategically placed in a service provider's mobile network 302 to intercept all, or nearly all, applications and forward them to a sample collection center 1112 of a network management system 100 for analysis. Network sniffers or analyzers 202 collection agents are capable of monitoring Internet traffic for downloads of executable applications by mobile devices 308.

For applications being downloaded from remote servers using TCP/IP and the Internet 304, computers and servers act as IP sniffers, or network analyzers 202 to intercept and collect executable applications found within the normal flow of network traffic to and from the Internet. TCP/IP sniffers are generally placed behind GGSN or PDSN nodes, or Gateways 306, ensuring that all the traffic flowing between the Internet 304 and the Internet enabled mobile devices 308 on the service provider's mobile network 302 are constantly monitored for malware applications.

Design and Operation of Collection Agents

Figure 12:
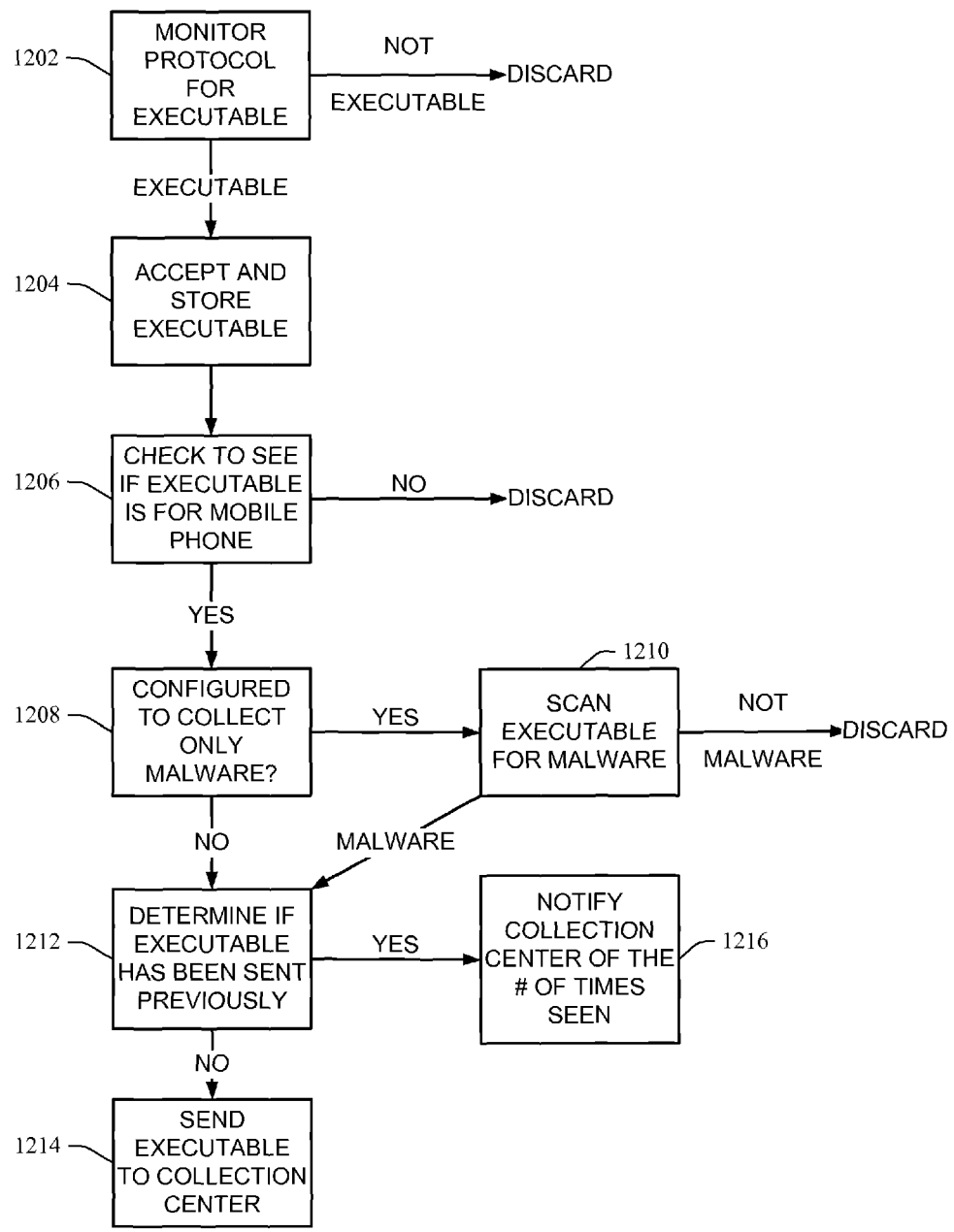
FIG. 12 is a flow chart diagram of an exemplary method utilized by collection agents.

Referring now to the flow chart diagram depicted in FIG. 12, a collection agent 1102, 202 monitors 1202 a protocol via a protocol handler 1114a, 1114b for data samples that contain executable code. If a sample does not contain executable code, the collection agent 1102, 202 discards the sample.

If at reference number 1202, the collection agent 1102, 202 determines that a sample contains executable code, the collection agent 1102, 202 accepts and stores 1204 the executables, and the proceeds to reference number 1206 to check the executable and determine if the executable is for a mobile device 308. If the collection agent 1102, 202 determines that the executable code of the sample is not targeted for a mobile device 308, the collection agent 1102, 202 discards the executable.

Proceeding to reference number 1208, the collection agent 1102, 202 determines if it is configured to collect only malware infected executables and if it is, the collection agent 1102, 202 proceeds to reference number 1210 wherein it first scans 1210 the executable for malware. If the executable sample does not contain maleware, the collection agent 1102, 202 discards the sample. If the executable sample does contain malware, the collection agent 1102, 202 proceeds to reference number 1212 to determine if the executable has been previously seen and sent to the sample collection center 1112. Returning to reference number 1208, if the collection agent 1102, 202 is not configured to collect only malware, the collection agent 1102, 202 skips the scanning 1210 operation and continues directly to reference number 1212.

At reference number 1212, if the executable has been seen previously by the collection agent 1102, 202, the collection agent 1102, 202 notifies 1216 the sample collection center 1112 that the malware is being seen and identified again. If the executable has been seen previously by the collection agent 1102, 202, the collection agent 1102, 202 sends 1214 the sample executable to the sample collection center 100 for further analysis and reporting, such as discussed above with CoreStats 100.

Collection agents 1102, 202 have the following general functionalities: monitoring 1202 a specific protocol via a protocol handler 1114a, 1114b for data samples having executable content; accepting 1204 such samples having executable content that are transferred through the protocol; checking 1206 if the executable is specifically for mobile devices 308 by looking at the executable file format, if it is not specifically for mobile devices 308, then ignoring the executable; and, sending 1214 the entire executable using a secure network connection (e.g., https) or a wireless data connection 1108e to the sample collection center 1112, such as CoreStats 100 discussed above. Alternatively, a collection agent 1102, 202 selectively forwards executables after checking 1206 to see if the executable is for a mobile device 308. In this embodiment of the invention, the collection agent 1102, 202 checks to see if it is configured 1208 to collect only malware infected applications and if it is, then it first scans 1210 the executable for malware and only proceeds if malware is detected. Next, the collection agent 1102, 202 proceeds to determine 1212 if that executable has already been sent to the malware collection center. If a collection agent 1102, 202 determines 1212 that the executable has already been sent to the sample collection center 1112, the collection agent 1102, 202 only notifies 1216 the sample collection center 1112 of the new occurrence of the executable. Alternatively, collection agent 1102, 202 notifies 1216 the sample collection center 1112 of the number of times it has seen the executable. If this is a new executable however, it sends 1214 the executable to the sample collection center 1112 for analysis and reporting.

The design, both hardware and software, of a collection agent 1102, 202 depends on its location in the service provider's mobile network 302. A honeypot collection agent 1102 for receiving Bluetooth 1108b communications via a Bluetooth protocol handler 1114a and Wi-Fi 1108a communications via a WiFi protocol handler 1114b contains devices with Bluetooth and/or Wi-Fi receivers. Typically, a collection agent 1102 maintains an open Bluetooth 1108b or Wi-Fi 1108a port at all times. The honeypot collection agent 1102 accepts all incoming mobile executables transferred to it on Bluetooth 1108b or Wi-Fi 1108a. The honeypot collection agent 1102 then automatically sends the executable file to a sample collection center 1112 server, such as in CoreStats 100, through a secure connection (e.g., https) or a wireless data connection 1108e. A Bluetooth enabled honeypot collection agent 1102 is placed in crowded areas like airports, coffee shops, and restaurants since Bluetooth is a short range protocol. Wi-Fi enabled honeypot collection agents 1102 have somewhat more extended ranges, but are similarly placed in airports, coffee shops, and restaurants, but are also placed in places where wireless security may be an issue such as office buildings, banks and stock exchanges.

An IP sniffer, or network analyser 202 collection agent is typically placed at the point of connection between a gateway 306 and the Internet 304. Mobile devices 308 access and download applications from remote servers on the Internet 304 through a gateway 306 called a Gateway GPRS Support Node (GGSN) or Packet Data Serving Node (PDSN). To obtain all executables arriving from the Internet 304, the IP sniffer, or network analyser 202 collection agent is placed behind the GGSN (or PDSN) and monitors the connection to the Internet 304. This collects all mobile executables downloaded from the Internet 304 and forwards them to a sample collection center 1112 of a network management system, e.g., CoreStats 100. Since the data is accessed at the network level, packets may be out of order when collected. The IP sniffer, or network analyser 202 collection agent re-assembles the data in the correct order before forwarding the entire executable file to the sample collection center 1112.

The collection agent 1102, 202 can be implemented using a general purpose computer. More particularly, a general purpose computer including a processor, memory and a system bus that couples the processor and memory can be used to implement the collection agent 1102, 202. The processor can be a microprocessor, microcontroller, or central processor unit (CPU) chip and printed circuit board (PCB). Any suitable bus architecture can be utilized to connect the processor and memory. Computer system memory can include static memory such as erasable programmable read only memory (EPROM), electronically erasable programmable read only memory (EEPROM), flash or bubble memory, as well as volatile memory, such as random access memory (RAM). In addition, the computer system can include storage media, such as hard disk drive, tape drive, optical disk drive or any other suitable media. In an alternate embodiment, the collection agent 1102, 202 is integrated with a mobile device 308 or any suitable network equipment in the service provider's mobile network 302. In an alternate embodiment, the collection agent 1102, 202 is one or more processes running on a mobile device 308 or any of the service provider's mobile network 302 equipment.

The above exemplary embodiment describes a system and method to collect potential malware applications from distributed locations throughout a service provider's mobile network 302, increasing the likelihood that new malware samples are captured once they start spreading. Early detection of malware allows preventative measures to be taken sooner, potentially preventing or at least reducing any damage the malware will ultimately cause.

Conclusion

While various embodiments have been described above, it should be understood that the embodiments have been presented by way of example only, and not limitation. It will be understood by those skilled in the art that various changes in form and details may be made therein without departing from the spirit and scope of the subject matter described herein and defined in the appended claims. Thus, the breadth and scope of the present invention should not be limited by any of the above-described exemplary embodiments, but should be defined only in accordance with the following claims and their equivalents.

What is claimed is:

1. A system that monitors malware within a mobile network, comprising:
a receiver component that obtains data regarding the malware transferred to a plurality of different mobile devices operating in the mobile network, the data comprising:
a first set of malware data, obtained from a first source positioned in the mobile network that monitors network data containing a first plurality of applications transferred to at least a first mobile device of the mobile devices and that scans the first plurality of applications to determine which of the first plurality of applications is a malware application, and
a second set of malware data obtained from a second source positioned in the mobile network that monitors network data containing a second plurality of applications transferred to at least a second mobile device of the mobile devices and that scans the second plurality of applications to determine which of the second plurality of applications is a malware application,
wherein the first source and the second source are separate from the first mobile device and the second mobile device, wherein the second source is of a different type than the first source, and wherein the first source and the second source are located at different positions within the mobile network;
an analysis component that processes the first set of malware data and the second set of malware data and generates a malware analysis of the malware applications included within the first plurality of applications transferred to the first mobile device of the mobile network and of the malware applications included within the second plurality of applications transferred to the second mobile device of the mobile network as a function of the data; and
a mitigation component that mitigates effects of the malware applications transmitted to the first and second mobile devices based at least in part on an aggregation of the first set of malware data and the second set of malware data.

2. The system of claim 1, wherein the first source and the second source are each selected from the group consisting of: a mobile phone, a malware collection agent, a BlueTooth enabled mobile device, a WiFi enabled mobile device, an IEEE 802.x enabled mobile device, a network traffic analyzer, a firewall, a network switch, a network router, a gateway, a network management system, and an Operations, Administration, Maintenance, and Provisioning (OAM&P) network management system.

3. The system of claim 1, wherein the first source comprises the at least one of the mobile devices, and wherein the second source comprises a network traffic analyzer positioned at the core of the mobile network.

4. The system of claim 1, wherein the mitigation component is configured to perform a preventative action, and wherein the preventative action is selected from the group consisting of: generation of an alert for transmission to at least one of the first and second mobile devices, direction of update of scanner software of the first and second mobile devices, and disablement of a data connection of the first and second mobile devices.

5. The system of claim 1, further comprising:
a network analyzer component that obtains a data packet; and
a malware scanner that evaluates the data packet and generates the data.

6. The system of claim 1, further comprising a client data server that obtains the data from a mobile device within the mobile network.

7. The system of claim 1, wherein the data includes mobile device specific information.

8. The system of claim 1, wherein the malware analysis includes a spreading pattern based upon correlation of the data from the first source and the second source.

9. The system of claim 1, further comprising a communication component that provides an update to a malware scanning algorithm at the first source.

10. A method of monitoring a mobile network, comprising:
obtaining malware data from which mobile device identity information for a plurality of different mobile devices operating in the mobile network is derived, wherein obtaining comprises:
receiving a first set of malware data from a first source positioned in the mobile network that monitors network data containing a first plurality of applications transferred to at least a first mobile device of the mobile devices and that scans the first plurality of applications to determine which of the first plurality of applications is a malware application; and
receiving a second set of malware data from a second source positioned in the mobile network that monitors network data containing a second plurality of applications transferred to at least a second mobile device of the mobile devices and that scans the second plurality of applications to determine which of the second plurality of applications is a malware application, wherein the first source and the second source are separate from the first mobile device and the second mobile device, wherein the second source is of a different type than the first source, and wherein the first source and the second source are located at different positions within the mobile network;
processing the malware data to produce a malware analysis that facilitates operator comprehension of a malware on the mobile network, wherein the malware analysis provides an indication of the identity information for the mobile devices, and wherein the malware analysis provides indications of whether the malware is present on the identified mobile devices, and wherein the malware analysis provides indications of the malware applications included in the first plurality of applications transferred to the first mobile device of the mobile network and the malware applications included in the second plurality of applications transferred to the second mobile device as a function of the obtained data; and
mitigating effects of the malware applications transmitted to the first and second mobile devices based at least in part on an aggregation of the first set of malware data and the second set of malware data.

11. The method of claim 10, further comprising:
receiving the malware data from one of the mobile devices; and
transmitting an acknowledgement of receipt of the malware data to cause the one of the mobile devices to delete the malware data.

12. The method of claim 10, wherein the first source and the second source are each selected from the group consisting of: a mobile phone, a malware collection agent, a BlueTooth enabled mobile device, a WiFi enabled mobile device, an IEEE 802.x enabled mobile device, a network traffic analyzer, a firewall, a network switch, a network router, a gateway, a network management system, and an Operations, Administration, Maintenance, and Provisioning (OAM&P) network management system.

13. The method of claim 10, wherein mitigating further comprises updating a firewall associated with the mobile network based at least in part on the malware analysis.

14. The method of claim 10, wherein mitigating further comprises directing a network analyzer to intercept data packets based at least in part on the malware analysis, to cause the network analyzer to scan the intercepted data packets for malware.

15. The method of claim 10, herein mitigating further comprises updating a network malware scanning algorithm based at least in part on the malware analysis.

16. The method of claim 10, wherein mitigating further comprises updating a malware scanning algorithm of the first and second mobile devices based at least in part on the malware analysis.

17. A system that facilitates mitigation of malware in a mobile network, comprising:
means for obtaining data regarding the malware transferred to a plurality of different mobile devices operating in the mobile network, the data comprising:
a first set of malware data obtained from a first source positioned in the mobile network that monitors network data containing a first plurality of applications transferred to at least a first mobile device of the mobile devices and that scans the first plurality of applications to determine which of the first plurality of applications is a malware application, and
a second set of malware data obtained from a second source positioned in the mobile network that monitors network data containing a second plurality of applications transferred to at least a second mobile device of the mobile devices and that scans the second plurality of applications to determine which of the second plurality of applications is a malware application,
wherein the first and second mobile devices are separate from the first and second sources, wherein the second source is of a different type than the first source, and wherein the first source and the second source are located at different positions within the mobile network;
means for processing the first set of malware data and the second set of malware data and for generating a malware analysis of the malware applications included within the first plurality of applications transferred to the first mobile device of the mobile network and the malware applications within the second set of applications transferred to the second mobile device of the mobile network based at least in part upon the first malware data and the second malware data and
means for mitigating effects of the malware applications transmitted to the first and second mobile devices based at least in part on an aggregation of the first set of malware data and the second set of malware data.

18. The system of claim 17, wherein the first source and the second source are each selected from the group consisting of: a mobile phone, a malware collection agent, a BlueTooth enabled mobile device, a WiFi enabled mobile device, an IEEE 802.x enabled mobile device, a network traffic analyzer, a firewall, a network switch, a network router, a gateway, a network management system, and an Operations, Administration, Maintenance, and Provisioning (OAM&P) network management system.

19. The system of claim 1, wherein the analysis component is configured to determine whether the first set of malware data includes an indication that executable code was transferred to or from a first mobile device within the mobile network, and whether the second set of malware data includes an indication that the same executable code was transferred to or from a second mobile device within the mobile network.

20. The system of claim 19, wherein the analysis component is configured to indicate, within the malware analysis, the number of mobile devices within the mobile network to which the same executable code has been transferred.

21. The system of claim 1, wherein the analysis component is configured to indicate, within the malware analysis, whether at least one of the first set of malware data and the second set of malware data indicate that executable code, transferred to or from a mobile device within the mobile network, includes malware.

22. The system of claim 1, wherein the analysis component is configured to determine changes in malware activity levels represented by the data regarding the malware in the mobile network relative to historical malware data for the mobile network, and to indicate, within the malware analysis, the determined changes in the malware activity levels.

23. The system of claim 1, wherein the analysis component is configured to indicate, within the malware analysis, types of malware over time based on the data regarding the malware in the mobile network and historical malware data for the mobile network.

24. The system of claim 1, wherein the analysis component is configured to indicate, within the malware analysis, spread of malware over time based on the data regarding the malware in the mobile network and historical malware data for the mobile network.

25. The system of claim 1, wherein the first source is positioned at a periphery of the mobile network, and wherein the second source is positioned within the core of the mobile network.

26. The method of claim 10, wherein the identity information for the mobile devices comprises telephone numbers for the mobile devices.

27. A method comprising:
receiving a first set of malware data from a first source positioned in a mobile network regarding malware applications transferred to at least a first mobile device of a plurality of mobile devices operating in the mobile network, wherein the first source monitors network data containing a first plurality of applications transferred to the first mobile device and scans the first plurality of applications to determine which of the first plurality of applications is a malware application;
receiving a second set of malware data from a second, different source positioned in the mobile network regarding malware applications transferred to at least a second mobile device of the plurality of mobile devices operating in the mobile network, wherein the second source monitors network data containing a second plurality of applications transferred to the second mobile device and scans the second plurality of applications to determine which of the second plurality of applications is a malware application, wherein the first source and the second source are separate from the first mobile device and the second mobile device, wherein the second source is of a different type than the first source, and wherein the first source and the second source are located at different positions within the mobile network;
analyzing the first set of malware data and the second set of malware data to compare the first set of malware data to the second set of malware data, and to compare the first and second sets of malware data to historical malware data for the mobile network;
generating a malware analysis, based on the analysis of the first and second sets of malware data and the historical malware data, that provides an indication of applications transferred to the mobile devices of the mobile network and an indication of one or more of changes in malware activity levels in the mobile network, types of malware in the mobile network, and spread of malware over time through the mobile network; and
mitigating effects of the malware applications transmitted to the first and second mobile devices based at least in part on an aggregation of the first set of malware data and the second set of malware data.

28. The method of claim 27, further comprising:
receiving, from the first source, an indication of executable code transferred to or from at least one of the one or more mobile devices; and
receiving, from the second source, an indication of the same executable code transferred to or from at least one of the one or more mobile devices;
wherein generating the malware analysis comprises providing an indication that the same executable code was transferred to or from two or more mobile devices of the mobile network.

29. A non-transitory computer-readable medium comprising instructions that, when executed, cause a processor to:
receive a first set of malware data from a first source positioned in a mobile network regarding malware applications transferred to at least a first mobile device of a plurality of mobile devices operating in the mobile network, wherein the first source monitors network data containing a first plurality of applications transferred to the first mobile device and scans the first plurality of applications to determine which of the first plurality of applications is a malware application;
receive a second set of malware data from a second, different source positioned in the mobile network regarding malware applications transferred to at least a second mobile device of the plurality of mobile devices operating in the mobile network, wherein the second source monitors network data containing a second plurality of applications transferred to the second mobile device and scans the second plurality of applications to determine which of the second plurality of applications is a malware application, wherein the first source and the second source are separate from the first mobile device and the second mobile device, wherein the second source is of a different type than the first source, and wherein the first source and the second source are located at different positions within the mobile network;
analyze the first set of malware data and the second set of malware data to compare the first set of malware data to the second set of malware data, and to compare the first and second sets of malware data to historical malware data for the mobile network;
generate a malware analysis, based on the analysis of the first and second sets of malware data and the historical malware data, that provides an indication of applications transferred to the mobile devices of the mobile network and an indication of one or more of changes in malware activity levels in the mobile network, types of malware in the mobile network, and spread of malware over time through the mobile network; and
mitigate effects of the malware applications transmitted to the first and second mobile devices based at least in part on an aggregation of the first set of malware data and the second set of malware data.

* * * * *